June 21, 1938.　　　　A. L. RUBOTTOM　　　　2,121,264
AUTOMOBILE AWNING
Filed June 24, 1936
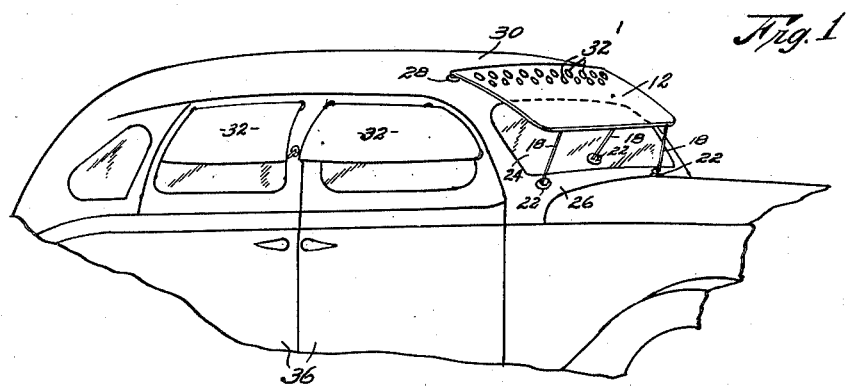
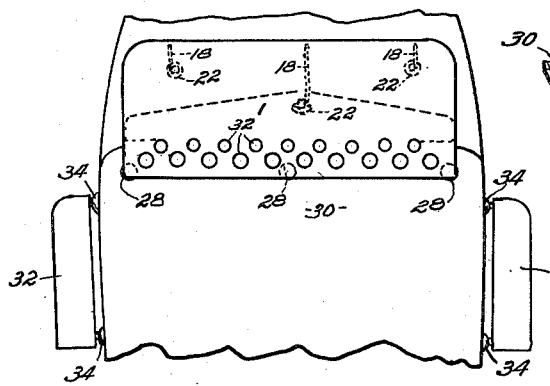
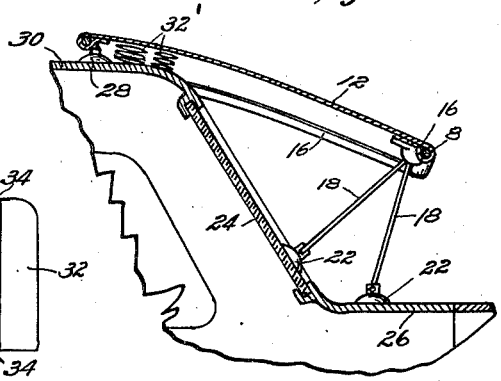
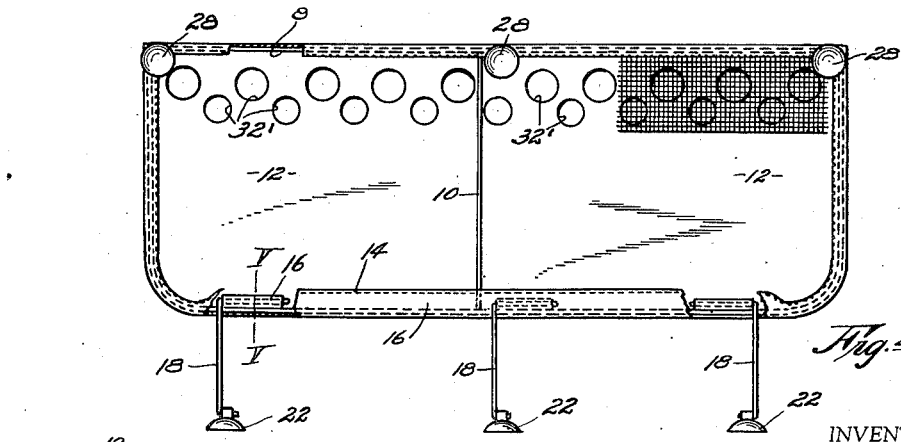
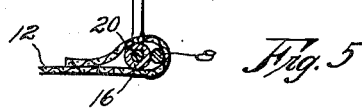
INVENTOR,
Albert L. Rubottom.
BY
ATTORNEYS.

Patented June 21, 1938

2,121,264

UNITED STATES PATENT OFFICE 2,121,264

AUTOMOBILE AWNING

Albert L. Rubottom, Kansas City, Mo.

Application June 24, 1936, Serial No. 86,993

9 Claims. (Cl. 156—15)

This invention relates to automobile awnings of the character which might be applied to the body of the automobile adjacent any of the windows thereof so that an over-hanging canopy is presented to exclude the entrance of sunlight and in respect to the windshield, to eliminate glare that might be obectionable to the driver.

One of the important aims of this invention is the provision of quickly attachable awning structures that may be affixed directly to the surface of the automobile body without altering the same and without the use of screws, bolts, clamps or other obectionable elements that have usually heretofore been employed in semi-permanently securing the awnings in place.

Another important aim of this invention is the provision of an automobile awning particularly useful in providing a canopy for the windshield of visorless automobiles, which awning is supported in an inclined over-hanging position with respect to the windshield and having means for attaching the rearwardly extended edge thereof to the automobile body top in spaced relation thereto so that excessive wind pressure exerted against the awning while the automobile is travelling forward will be relieved.

A yet further object of this invention is to provide an awning of a special character which may be secured to visorless automobiles to over-hang the inclined windshield thereof so as to preclude the entrance of an objectionable amount of sunlight, which awning is provided with unique, novel and rugged structure for removably affixing the same to the outer surface of the automobile body and which awning further has a plurality of perforations formed therethrough along a marginal edge thereof to supplement the space between awning and automobile body in relieving wind pressure when the automobile is in operation.

A still further object of this invention is the provision of a new article of manufacture in the form of an automobile awning especially constructed for attachment to visorless automobile bodies to over-hang the windshield thereof, which awning is provided with a plurality of suction cups along one edge thereof and a series of perforations in spaced relation to said edge so that that portion of the awning along the said edge may be securely attached to the surface of the automobile in spaced relation thereto at a point above and rearwardly of the windshield whereby wind pressure created through the operation of the automobile will be relieved and likelihood of dislodgement is precluded; said awning having at the opposite edge thereof a number of adjustable brackets having on the projected ends thereof suction cups for further attaching the forward portion of the awning to a suitable part of the automobile which, in practice, may be either the cowl or windshield itself.

A large number of minor objects contemplated by the invention and specific structural details forming refinements will appear during the course of the following specification, referring to the accompanying drawing, wherein, Figure 1 is a fragmentary perspective view of an automobile body having awnings, constructed in accordance with this invention, attached thereto.

Fig. 2 is a fragmentary top plan view of the forward portion of an automobile body with awning attached.

Fig. 3 is an enlarged fragmentary vertical sectional view through the awning and a portion of the automobile body including the windshield thereof.

Fig. 4 is an inverted plan view of the awning entirely removed from association with the automobile body, and Fig. 5 is an enlarged detailed sectional view through the awning taken on line V—V of Fig. 4.

Since the advent of visorless automobile bodies a great deal of discomfort has been experienced by drivers as a result of the entrance of sunlight through the inclined windshield, especially when the automobile is directed toward the sun and this invention contemplates the combination with such an automobile body of an awning that will not only serve as a visor but may be moved to a desired position with respect to the lower edge of the windshield as conditions require. It is further conceivable that this invention might be embodied in awnings attachable to the side of the automobile body where windows are located and the novel means for securing the awnings in place and which are illustrated in the accompanying drawing, are common to all forms of the awning shown.

Referring particularly to the windshield awning shown in all views of the drawing and especially the one detailed in Figs. 4 and 5, the numeral 8 designates a continuous, preferably circumscribing frame that may be made of strong wire and which may be cross braced as at 10 in suitable fashion. In the preferred embodiment a flexible covering 12 constructed of fabric or the like comprises the canopy portion of the awning and this covering is stretched over frame 8 and secured in place by stitching 14 or suitable adhesives so that the frame is concealed and further to present a neat appearance. Frame 8, along one stretch thereof forming a longitudinal edge of the awning, has associated therewith a plurality of tubular members 16 designed to receive one end of each arm 18 respectively of the plurality of brackets that are designed to support the forward edge of the awning. These arms 18 have a length 20 thereof extending laterally and swinging movement for purpose of adjustment is permitted. The other end of arm 18 has pivotally secured thereto a suction cup 22 of conventional design that may be secured directly to the outer surface of either windshield 24 of the automobile or cowl 26 thereof. In some instances where a ventilator is provided in cowl 26, the central arm 18 is angled inwardly as illustrated in Figs. 1, 2 and 3. A plurality of suction cups 28 similar to those designated by numeral 22 are affixed by loose connections to the opposite longitudinal edge of canopy 12 so that this edge is rigidly secured and supported in spaced relation to the top 30 of the automobile body rearwardly and above windshield 24. A number of perforations 32' are provided through fabric 12 forming the canopy and these perforations are in spaced relation and located along a marginal edge adjacent cups 28 which hold the longitudinally arched edge spaced an even distance from the automobile top throughout its length. Wind pressure exerted beneath the awning will be relieved as a result of the presence of these perforations 32' and said perforations obviously supplement the space provided between canopy 12 and top 30 in assuring that the awning will not be dislodged even though the automobile is travelling at a great rate of speed.

Awnings 32 are especially formed so that they present a neat appearance when attached to the side of the automobile body and suction cups 34 constitute the means for securing these awnings to the surface of automobile doors 36 so that the awning may swing with the door and not remain in a position on the automobile to restrict the opening when doors 36 are swung outwardly.

It is conceivable that awnings embodying this invention might be made of light sheet metal or other substances and such reenforcing across perforations 32' as may be desired may be there positioned. An example of such reenforcement is illustrated at one end of Fig. 4 and comprises a layer of ordinary screen wire that may have canopy 12 at the edge of the perforations secured thereto.

Forms of the awning other than those illustrated and herein described might be made to embody the invention and while the preferred embodiment has been exemplified and described, it is desired to be limited only by the spirit of the invention and the scope of the appended claims.

Having thus described the invention what I claim as new and desire to be secured by Letters Patent is:

1. An awning constructed for quick attachment to an automobile body provided with an inclined front wall having a window therein with a windshield thereover, said awning comprising a canopy; means along one edge of the canopy for attaching the same to the inclined front wall of said automobile body above and rearwardly of the windshield; and a plurality of brackets on the canopy at the opposite edge thereof for attaching that edge to the body of the automobile below and forwardly of the windshield to dispose the awning in overhanging inclined relation with the windshield, said one edge of the canopy being spaced above the automobile body a sufficient distance to permit the escape of air from beneath the canopy when the automobile is traveling.

2. An awning constructed for quick attachment to an automobile provided with an inclined windshield and front wall merging with the automobile top, said awning comprising a canopy; means along one edge of the canopy for attaching the same to the top of the automobile body above and rearwardly of the windshield; and a plurality of brackets on the canopy at the opposite edge thereof for attaching that edge to the body of the automobile below and forwardly of the windshield to dispose the awning in overhanging relation with the windshield, the means along the said one edge of the canopy being formed to support the canopy in spaced relation to the automobile body above the top to permit the escape of air from beneath the canopy as the automobile is traveling forwardly, said one edge of the canopy being longitudinally arched to conform to the contour of the automobile top.

3. An awning constructed for quick attachment to an automobile provided with an inclined windshield and front wall merging with the automobile top, said awning comprising a canopy; means along one edge of the canopy for attaching the same to the top of the automobile body above and rearwardly of the windshield; and a plurality of brackets on the canopy at the opposite edge thereof for attaching that edge to the body of the automobile below and forwardly of the windshield to dispose the awning in overhanging relation with the windshield, the means along the said one edge of the canopy being formed to support the canopy in spaced relation to the automobile body above the top to permit the escape of air from beneath the canopy as the automobile is traveling forwardly, said brackets being hingedly secured to the canopy to allow the same to engage various portions of the automobile when in place to assist in holding the canopy in operative position.

4. An awning for automobile windshields comprising a forwardly and downwardly inclined canopy overlying a portion of the automobile top above and rearwardly of the windshield when in operative position; and means for attaching the overlying portion to the automobile top in spaced relation thereto.

5. An awning for automobile windshields comprising a forwardly and downwardly inclined canopy overlying a portion of the automobile top above and rearwardly of the windshield when in operative position; means for attaching the overlying portion to the automobile top in spaced relation thereto; and means for securing the remaining portion of the canopy in place forwardly of the windshield and above the lower edge thereof.

6. An awning constructed for quick attachment to an automobile provided with an inclined windshield and front wall merging with the automobile top, said awning comprising a rigid frame; a fabric covering stretched over the frame and closing the same; a plurality of suction cups having loose connection with the frame along one side thereof for securing that edge of the awning to the top of the automobile rearwardly of the windshield with a portion of the fabric covering overlying the top in spaced relation thereto; a plurality of brackets each having one end hingedly secured to the other side of said frame; and a suction cup hingedly carried by the other ends of the brackets respectively for holding said other side in place forwardly of the windshield.

7. An awning constructed for quick attachment to an automobile provided with a windshield, said awning comprising a canopy; brackets carried by the canopy for attaching the same to the automobile with a portion thereof along the rear marginal edge spaced above the automobile body; and suction cups carried by the brackets for engaging the body surface, said portion of the canopy above the automobile body being in spaced, substantially parallel relation with the automobile, whereby to permit the escape of air from beneath the canopy into the wind stream passing across the top of the canopy and automobile body when the automobile is traveling.

8. An awning constructed for quick attachment to an automobile provided with an inclined windshield and front wall merging with the automobile top, said awning comprising a frame; a fabric covering stretched over the frame and closing the same; and a plurality of suction cups carried by the frame in spaced relation thereto for securing the awning to the automobile in an inclined position with the rear portion of said awning spaced above the automobile a sufficient distance to permit the escape of air from beneath the awning when the automobile is traveling, the angle of inclination of said awning and the space between the awning and the automobile body being such as to equalize the pressures exerted on the top and bottom sides of the fabric.

9. An awning constructed for quick attachment to an automobile provided with an inclined windshield and front wall merging with the automobile top, said awning comprising a frame; a fabric covering stretched over the frame and closing the same; a plurality of brackets carried by the frame; and suction cups mounted on the brackets for holding the frame and the fabric in place with the rear margin of the fabric spaced above the automobile body a sufficient distance to permit the escape of air from beneath the awning.

ALBERT L. RUBOTTOM.